(12) United States Patent
Crume et al.

(10) Patent No.: US 11,863,704 B2
(45) Date of Patent: Jan. 2, 2024

(54) CALL LIMITING USING BURST DETECTION

(71) Applicant: International Business Machines Corporation, Armonk, NY (US)

(72) Inventors: Jeffery Crume, Raleigh, NC (US); Jose F. Bravo, Old Greenwich, CT (US)

(73) Assignee: International Business Machines Corporation, Armonk, NY (US)

( * ) Notice: Subject to any disclaimer, the term of this patent is extended or adjusted under 35 U.S.C. 154(b) by 310 days.

(21) Appl. No.: 17/368,017

(22) Filed: Jul. 6, 2021

(65) Prior Publication Data

US 2023/0008835 A1 Jan. 12, 2023

(51) Int. Cl.
*H04M 3/22* (2006.01)
*H04M 3/42* (2006.01)
*H04M 3/38* (2006.01)

(52) U.S. Cl.
CPC ............ *H04M 3/229* (2013.01); *H04M 3/38* (2013.01); *H04M 3/42136* (2013.01)

(58) Field of Classification Search
None
See application file for complete search history.

(56) References Cited

U.S. PATENT DOCUMENTS

| | | | |
|---|---|---|---|
| 8,671,020 B1* | 3/2014 | Morrison | G06Q 30/0255 379/112.01 |
| 8,781,077 B2* | 7/2014 | Keene | H04M 3/2263 379/201.12 |
| 9,100,455 B2 | 8/2015 | Li et al. | |
| 10,582,041 B2* | 3/2020 | Gallagher | H04M 3/2281 |
| 11,343,376 B1* | 5/2022 | Van Arkel | H04M 3/36 |
| 2014/0192965 A1* | 7/2014 | Almeida | H04M 3/2281 379/70 |
| 2015/0066633 A1* | 3/2015 | Agrawal | H04M 3/229 705/14.45 |
| 2015/0373193 A1 | 12/2015 | Cook | |
| 2016/0005016 A1* | 1/2016 | Eliahu | G07F 17/0021 705/44 |
| 2020/0143822 A1 | 5/2020 | Carriero et al. | |

(Continued)

FOREIGN PATENT DOCUMENTS

DE 102005046376 A1 4/2007
DE 102006026924 B4 8/2008

(Continued)

OTHER PUBLICATIONS

Mell et al., "The NIST Definition of Cloud Computing", Recommendations of the National Institute of Standards and Technology, Sep. 2011, 7 pages.

*Primary Examiner* — Quoc D Tran
(74) *Attorney, Agent, or Firm* — Stosch Sabo (57) ABSTRACT

Described are techniques including a computer-implemented method of maintaining a list of newly assigned phone numbers. The method further comprises intermittently removing phone numbers from the list of newly assigned phone numbers. The method further comprises determining that a newly assigned phone number initiates a number of calls per unit time that exceeds a threshold number of calls per unit time. The method further comprises automatically flagging the newly assigned phone number as a possible robocaller.

20 Claims, 5 Drawing Sheets

(56) References Cited

U.S. PATENT DOCUMENTS

| | | | |
|---|---|---|---|
| 2020/0244804 A1 | 7/2020 | Quilici et al. | |
| 2020/0252506 A1* | 8/2020 | Akanksha | H04M 3/42102 |
| 2021/0092228 A1 | 3/2021 | Grabowski et al. | |

FOREIGN PATENT DOCUMENTS

| | | |
|---|---|---|
| JP | 5105114 B2 | 12/2012 |
| KR | 20050068923 A | 7/2005 |
| KR | 100869243 B1 | 11/2008 |
| KR | 101287737 B1 | 7/2013 |

* cited by examiner

CALL LIMITING USING BURST DETECTION

BACKGROUND

The present disclosure relates to reducing unauthorized robocalls, and, more specifically, to automatically identifying unauthorized robocallers using burst detection.

Robocalls deliver pre-recorded messages using a computerized autodialer or use a computerized autodialer to transfer answered calls to a human representative. Some robocalls are illegal, such as robocalls that are made with nefarious intent. Nefarious robocalls can attempt to procure personal and/or confidential information from a callee, directly or indirectly obtain money from a callee, and the like.

SUMMARY

Aspects of the present disclosure are directed toward a computer-implemented method of maintaining a list of newly assigned phone numbers. The method further comprises intermittently removing phone numbers from the list of newly assigned phone numbers. The method further comprises determining that a newly assigned phone number initiates a number of calls per unit time that exceeds a threshold number of calls per unit time. The method further comprises automatically flagging the newly assigned phone number as a possible robocaller.

Additional aspects of the present disclosure are directed to systems and computer program products configured to perform the methods described above. The present summary is not intended to illustrate each aspect of, every implementation of, and/or every embodiment of the present disclosure.

BRIEF DESCRIPTION OF THE DRAWINGS

The drawings included in the present application are incorporated into and form part of the specification. They illustrate embodiments of the present disclosure and, along with the description, serve to explain the principles of the disclosure. The drawings are only illustrative of certain embodiments and do not limit the disclosure.

While the present disclosure is amenable to various modifications and alternative forms, specifics thereof have been shown by way of example, in the drawings and will be described in detail. It should be understood, however, that the intention is not to limit the present disclosure to the particular embodiments described. On the contrary, the intention is to cover all modifications, equivalents, and alternatives falling within the spirit and scope of the present disclosure.

DETAILED DESCRIPTION

Aspects of the present disclosure are directed toward reducing unauthorized robocalls, and, more specifically, to automatically identifying unauthorized robocallers using burst detection. While not limited to such applications, embodiments of the present disclosure may be better understood in light of the aforementioned context.

Various ineffective strategies currently exist for limiting unauthorized robocallers. One class of strategies utilizes no-call lists, authorized call lists, and/or unauthorized call lists. However, a no-call list (e.g., allowing a recipient to add their number to a database indicating they do not wish to receive certain types of robocalls) is often simply ignored by unauthorized robocallers. Meanwhile, using authorized lists (e.g., only allowing a recipient to receive calls from a predesignated list of numbers) can cause the recipient to miss legitimate calls from new or unknown numbers. Further, using unauthorized lists (e.g., disallowing a recipient to receive calls from a predesignated list of numbers associated with known unauthorized robocallers) is easily circumvented by an unauthorized robocaller. For example, the unauthorized robocaller can obtain a new number (or spoof their true number) to avoid having a caller number match a phone number on an unauthorized list.

Another class of ineffective strategies relies on call analysis to determine whether a call from an unknown number includes a voice component, and if so, if the voice component matches robocaller characteristics. However, such strategies require incoming calls to be answered in order to be evaluated. Further, such strategies are rife with personal data privacy issues.

Aspects of the present disclosure are directed to strategies for automatically identifying unauthorized robocallers and overcoming the drawbacks discussed above. Aspects of the present disclosure can include (i) maintaining a list of newly assigned phone numbers by a provider (e.g., a telephone company (telco), a Voice over Internet Protocol (VoIP) provider, etc.); (ii) pruning the list of newly assigned phone numbers by age (e.g., in order to maintain a manageably sized list of numbers for evaluation); (iii) determining that a newly assigned phone number initiates a number of calls placed that exceeds a threshold number of calls per unit time (e.g., indicating robocaller behavior); and/or (iv) automatically flagging the newly assigned phone number as a possible robocaller. In some embodiments, the method further includes maintaining a list of registered robocallers and comparing the newly assigned phone number to the list of registered robocallers to determine whether or not the newly assigned phone number is an authorized robocaller (and thus, not subject to being automatically flagged). Further, in some embodiments, the method further includes automatically suspending any phone number associated with an identified unauthorized robocaller.

Aspects of the present disclosure realize numerous advantages relative to other strategies for mitigating unauthorized robocalls. First, aspects of the present disclosure are implemented at the provider level rather than the recipient level. Since the provider has access to more information than recipients (e.g., the amount, rate, and types of calls made and received by phone numbers managed by the provider), the provider can more accurately and quickly identify and mitigate unauthorized robocallers than solutions implemented at the recipient level (e.g., implemented on a user's personal phone).

Second, aspects of the present disclosure are automated. In other words, aspects of the present disclosure do not require a recipient to notify a provider of an unauthorized robocaller, sign up for a no-call list, configure an authorized call list, configure an unauthorized call list, or configure any other settings for preventing unauthorized robocallers. Nor does the present disclosure require the provider to manually identify numbers as potentially unauthorized robocallers. Accordingly, aspects of the present disclosure improve usability for providers and users alike. Further, aspects of the present disclosure accelerate identification and mitigation of potentially unauthorized robocallers.

Third, aspects of the present disclosure are computationally inexpensive insofar as aspects of the present disclosure prune the list of newly assigned phone numbers by age and/or usage so that a manageable number of newly assigned phone numbers are being monitored for robocaller behavior during any given time interval.

Fourth, aspects of the present disclosure do not require calls to be answered to determine if they are a robocall or not. This advantage improves security, improves usability, and reduces the risk of mishandling private information (e.g., a third party is not analyzing the voice content of a recipient's calls, as is the case in some inferior solutions).

Fifth, aspects of the present disclosure are robust against unauthorized robocallers that spoof phone numbers or otherwise manipulate caller identification information. When unauthorized robocallers spoof phone numbers, they place a call with one number and alter the metadata of the call to indicate another, false number is making the call. Spoofed phone numbers make it difficult or impossible for a recipient of the unauthorized robocall to accurately identify the phone number that originated the call. Advantageously, aspects of the present disclosure monitor call characteristics from newly registered phone numbers rather than relying on caller identification mechanisms to identify incoming robocalls. Accordingly, aspects of the present disclosure can accurately identify even those unauthorized robocalls utilizing phone number spoofing.

The aforementioned advantages are example advantages and are not limiting. Further, embodiments of the present disclosure can exist which realize all, some, or none of the aforementioned example advantages while still remaining within the spirit and scope of the present disclosure.

Figure 1:
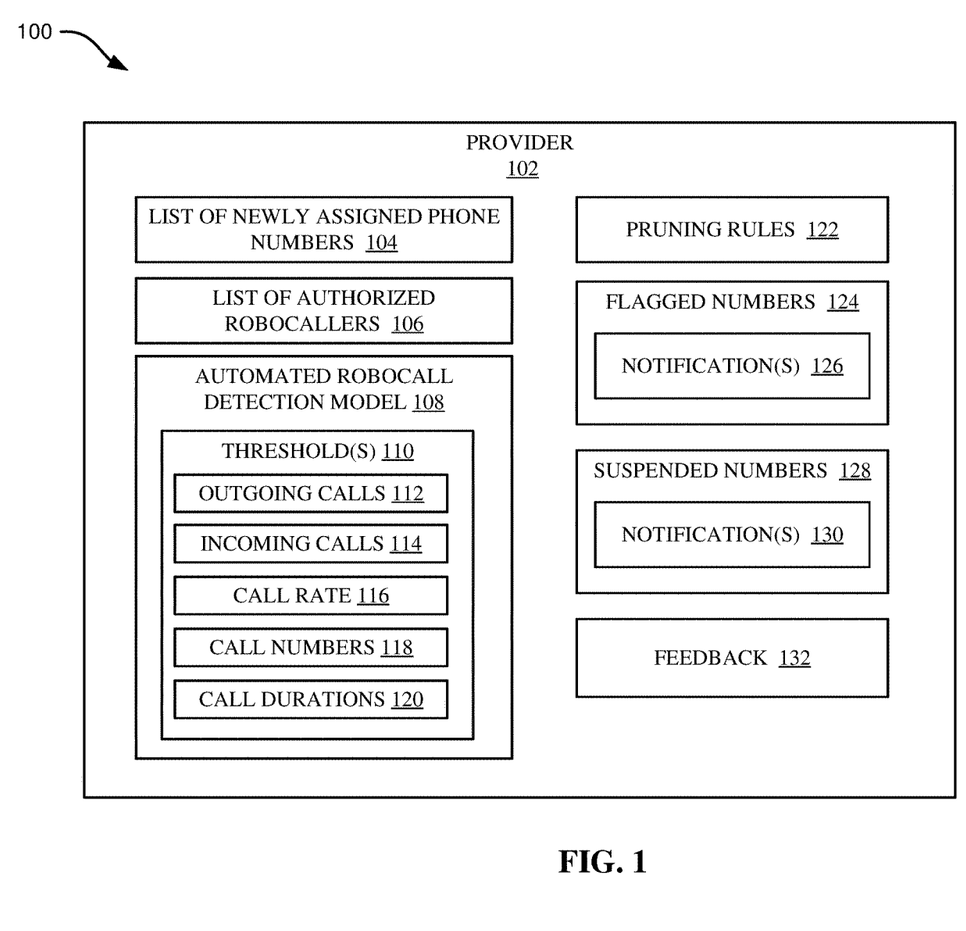
FIG. 1 illustrates a block diagram of an example computational environment for automatically identifying unauthorized robocallers, in accordance with some embodiments of the present disclosure.

Referring now to the figures, FIG. 1 illustrates a block diagram of an example computational environment 100 for automatically identifying unauthorized robocallers, in accordance with some embodiments of the present disclosure. The computational environment 100 includes a provider 102. The provider 102 can be, for example, a telco or a VoIP provider. The provider 102 can disburse, assign, and/or manage phone numbers associated with landlines, cell phones, and/or VoIP phone numbers.

The provider 102 can maintain a list of newly assigned phone numbers 104. The list of newly assigned phone numbers 104 can include phone numbers that satisfy one or more pruning rules 122. Pruning rules 122 can relate to age, usage, and/or other characteristics. For example, phone numbers can be pruned from the list of newly assigned phone numbers 104 after a threshold amount of time has passed since the phone number was created, after a threshold amount of calls have been placed and/or received since the phone number was created, and/or other rules that may be stored in pruning rules 122.

Provider 102 further maintains a list of authorized robocallers 106. The list of authorized robocallers 106 can be created by the provider 102 based on information available to the provider 102. In other embodiments, the list of authorized robocallers 106 can be retrieved from a governmental, nonprofit, and/or other public or private database storing records of authorized robocallers. The list of authorized robocallers 106 can be used to differentiate unauthorized robocallers from authorized robocallers for possible robocallers detected by aspects of the present disclosure.

Provider 102 further includes an automated robocall detection model 108. The automated robocall detection model 108 can automatically detect robocallers using one or more phone numbers of the list of newly assigned phone numbers 104. The automated robocall detection model 108 can use one or more thresholds 110 to differentiate possible robocallers from regular users. The one or more thresholds 110 can refer to any metric threshold or combination of metric thresholds that is capable of differentiating robocallers from regular users with acceptable accuracy. The one or more thresholds 110 can rely on metrics such as, but not limited to, outgoing calls 112 (e.g., the total number of calls placed), incoming calls 114 (e.g., the total number of calls received), call rate 116 (e.g., the number of calls placed and/or received per unit time), call numbers 118 (e.g., characteristics of the phone numbers called by or called to respective phone numbers such as, for example, sequentially called numbers, etc.), and/or call durations 120 (e.g., an amount of time spent on each call, an average amount of time spent on each call, a median amount of time spent on each call, etc.).

One or more of the outgoing calls 112, incoming calls 114, call rate 116, call numbers 118, and/or call durations 120 can be used to create one or more thresholds 110 useful for differentiating robocallers from regular users. For example, in some embodiments, the one or more thresholds 110 are based on call rate 116, where a call rate 116 above a threshold 110 (e.g., ten calls per minute, one-hundred calls per hour, one-thousand calls per day, etc.) can be used to identify a potentially unauthorized robocaller. As another example, the threshold 110 can be based on a ratio of outgoing calls 112 to incoming calls 114, where a ratio above the threshold 110 (e.g., 10, 100, 1,000, etc.) can identify a potentially unauthorized robocaller.

Regardless of the specific metrics used, the one or more thresholds 110 can be used to identify potentially unauthorized robocallers. Any identified potentially unauthorized robocallers can be compared to the list of authorized robocallers 106. If there is no match between the identified potentially unauthorized robocaller and the list of authorized robocallers 106, then the identified potentially unauthorized robocaller can be automatically added to flagged numbers 124. Each number in flagged numbers 124 can generate a notification 126 that can be sent to a user interface associated with the provider 102 and/or to the identified potentially unauthorized robocaller. In some embodiments, each of the identified potentially unauthorized robocallers can automatically have their associated numbers added to suspended numbers 128 and access to their phone number frozen, paused, terminated, or otherwise reduced. Notifications 130 can be sent to each of the suspended numbers 128 and/or to a user interface associated with the provider 102.

Finally, provider 102 can utilize feedback 132. Feedback 132 can be generated by the provider 102 and/or received by the provider 102. Feedback 132 can indicate correct and incorrect classifications of phone numbers. For example, feedback 132 can identify an unauthorized robocaller that was not detected by the automated robocall detection model 108 (e.g., a false negative). Conversely, the feedback 132 can identify an authorized robocaller or regular user that was identified as an unauthorized robocaller (e.g., a false positive). Collectively, the automated robocall detection model 108 can use the feedback 132 to tune the one or more thresholds 110 to improve accuracy over time.

Figure 2:
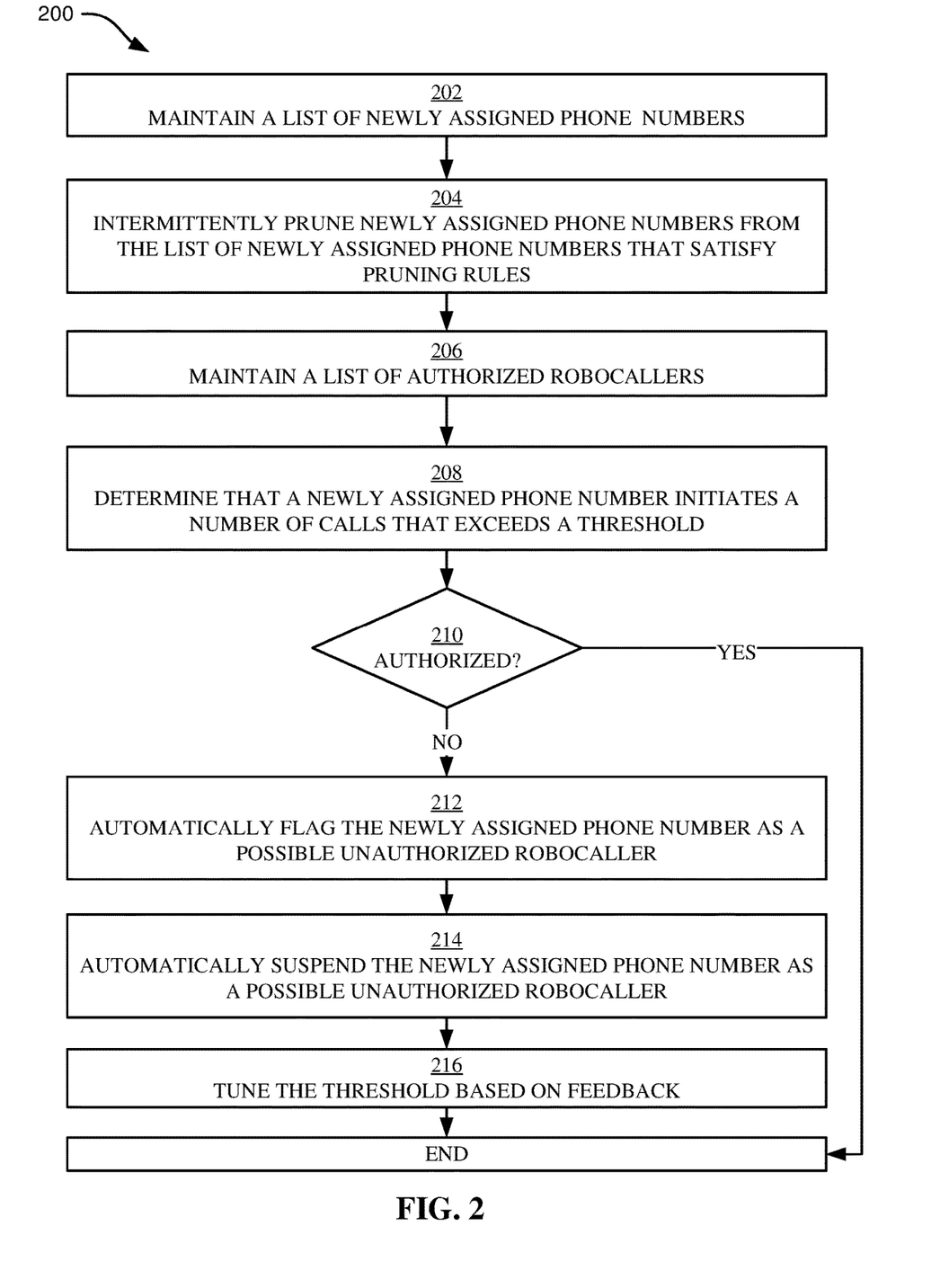
FIG. 2 illustrates a flowchart of an example method for identifying unauthorized robocallers, in accordance with some embodiments of the present disclosure.

FIG. 2 illustrates a flowchart of an example method 200 for identifying unauthorized robocallers, in accordance with some embodiments of the present disclosure. The method 200 can be performed by a computer, a processor, a provider 102 of FIG. 1, or another combination of hardware and/or software.

Operation 202 includes maintaining a list of newly assigned phone numbers 104. The list of newly assigned phone numbers 104 can be maintained by a provider 102, such as a telco or a VoIP provider. The list of newly assigned phone numbers 104 can comprise recently (e.g., within a threshold period of time and/or usage) created, assigned, or otherwise activated phone numbers associated with a landline, a cellular phone, and/or a VoIP phone number.

Operation 204 includes continuously, periodically, or intermittently pruning newly assigned phone numbers from the list of newly assigned phone numbers 104 that satisfy pruning rules 122. For example, once a newly assigned phone number has been activated for a certain amount of time (e.g., a week, a month, etc.) and/or once a newly assigned phone number has been used a certain amount (e.g., made or received at least one-hundred calls), then the newly assigned phone number can be removed from the list of newly assigned phone numbers 104. Alternatively, the list of newly assigned phone numbers 104 can be pruned to keep its size under a threshold. Advantageously, pruning the list of newly assigned phone numbers 104 according to pruning rules 122 keeps the list of newly assigned phone numbers 104 reasonably sized, thereby limiting the computational workload required by implementing the method 200.

Operation 206 includes maintaining a list of authorized robocallers 106. The list of authorized robocallers 106 can be internally curated or obtained from one or more public or private directories of authorized robocallers.

Operation 208 includes determining that a newly assigned phone number initiates a number of calls that exceeds the one or more thresholds 110. For example, operation 208 can detect that the newly assigned phone number initiated a threshold number of calls per unit time (e.g., a call rate 116 such as five calls per minute, fifty calls per hour, five hundred calls per day, etc.). Any number of other thresholds 110 can be used based on other metrics (and/or ratios of such metrics) such as, but not limited to, outgoing calls 112, incoming calls 114, call rate 116, call numbers 118, and/or call durations 120.

Operation 210 includes determining whether the newly assigned phone number is an authorized robocaller. Operation 210 can include comparing the newly assigned phone number with numbers in the list of authorized robocallers 106. If a match is found (210: YES), then the newly assigned phone number is an authorized robocaller and the method 200 ends. If a match is not found (210: NO), then the newly assigned phone number is not an authorized robocaller and the method 200 proceeds to operation 212. Advantageously, operation 210 prevents aspects of the present disclosure from flagging or suspending authorized robocallers (e.g., emergency alert systems).

Operation 212 includes automatically flagging the newly assigned phone number as a possible unauthorized robocaller by adding the newly assigned phone number to a list of flagged numbers 124. In some embodiments, operation 212 further includes generating and/or transmitting a notification 126 indicating that the newly assigned phone number is flagged as a possible unauthorized robocaller. The notification 126 can be transmitted to a user interface associated with the provider 102 and/or to the newly assigned phone number.

Operation 214 includes automatically suspending the newly assigned phone number as a possible unauthorized robocaller by adding the newly assigned phone number to a list of suspended numbers 128. Suspending the newly assigned phone number can include pausing, freezing, deactivating, and/or removing the newly assigned phone number from service. In some embodiments, suspending the newly assigned phone number includes adding metadata to the newly assigned phone number identifying the newly assigned phone number as a likely robocaller. In some embodiments, operation 214 further includes generating and/or transmitting a notification 130 indicating that the newly assigned phone number is suspended as a possible unauthorized robocaller. The notification 130 can be transmitted to a user interface associated with the provider 102 and/or to the newly assigned phone number.

Operation 216 includes tuning the one or more thresholds 110 based on feedback 132. The feedback 132 can identify correct characterizations and/or incorrect characterizations (e.g., false-positives and/or false-negatives) of newly assigned phone numbers as unauthorized robocallers. The one or more thresholds 110 can be tuned to correctly classify each phone number as an unauthorized robocaller or not consistent with the feedback 132.

Figure 3:
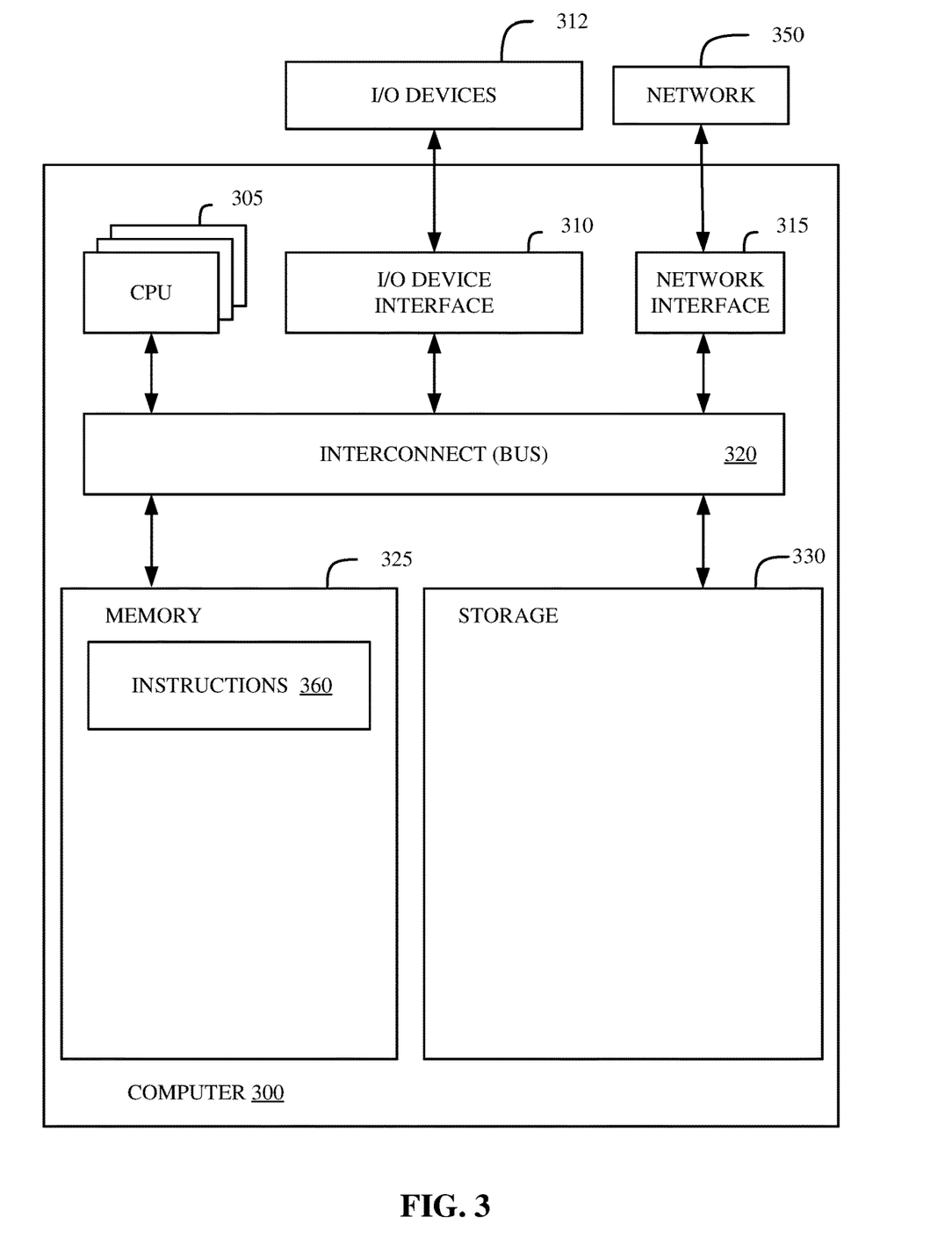
FIG. 3 illustrates a block diagram of an example computer, in accordance with some embodiments of the present disclosure.

FIG. 3 illustrates a block diagram of an example computer 300 in accordance with some embodiments of the present disclosure. In various embodiments, computer 300 can perform any or all portions of the method described in FIG. 2 and/or implement the functionality discussed in FIG. 1. In some embodiments, computer 300 receives instructions related to the aforementioned methods and functionalities by downloading processor-executable instructions from a remote data processing system via network 350. In other embodiments, computer 300 provides instructions for the aforementioned methods and/or functionalities to a client machine such that the client machine executes the method, or a portion of the method, based on the instructions provided by computer 300. In some embodiments, the computer 300 is incorporated into (or functionality similar to computer 300 is virtually provisioned to) one or more entities illustrated in FIG. 1 and/or other aspects of the present disclosure.

Computer 300 includes memory 325, storage 330, interconnect 320 (e.g., a bus), one or more CPUs 305 (also referred to as processors herein), I/O device interface 310, I/O devices 312, and network interface 315.

Each CPU 305 retrieves and executes programming instructions stored in memory 325 or storage 330. Interconnect 320 is used to move data, such as programming instructions, between the CPUs 305, I/O device interface 310, storage 330, network interface 315, and memory 325. Interconnect 320 can be implemented using one or more buses. CPUs 305 can be a single CPU, multiple CPUs, or a single CPU having multiple processing cores in various embodiments. In some embodiments, CPU 305 can be a digital signal processor (DSP). In some embodiments, CPU 305 includes one or more 3D integrated circuits (3DICs) (e.g., 3D wafer-level packaging (3DWLP), 3D interposer based integration, 3D stacked ICs (3D-SICs), monolithic 3D ICs, 3D heterogeneous integration, 3D system in package (3DSiP), and/or package on package (PoP) CPU configurations). Memory 325 is generally included to be representative of a random-access memory (e.g., static random-access memory (SRAM), dynamic random-access memory (DRAM), or Flash). Storage 330 is generally included to be representative of a non-volatile memory, such as a hard disk drive, solid state device (SSD), removable memory cards, optical storage, or flash memory devices. In an alternative embodiment, storage 330 can be replaced by storage area-network (SAN) devices, the cloud, or other devices connected to computer 300 via I/O device interface 310 or network 350 via network interface 315.

In some embodiments, memory 325 stores instructions 360. However, in various embodiments, instructions 360 are stored partially in memory 325 and partially in storage 330, or they are stored entirely in memory 325 or entirely in storage 330, or they are accessed over network 350 via network interface 315.

Instructions 360 can be computer-readable and computer-executable instructions for performing any portion of, or all of, the method of FIG. 2 and/or implement the functionality discussed in FIG. 1. Although instructions 360 are shown in memory 325, instructions 360 can include program instructions collectively stored across numerous computer-readable storage media and executable by one or more CPUs 305.

In various embodiments, I/O devices 312 include an interface capable of presenting information and receiving input. For example, I/O devices 312 can present information to a user interacting with computer 300 and receive input from the user.

Computer 300 is connected to network 350 via network interface 315. Network 350 can comprise a physical, wireless, cellular, or different network.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
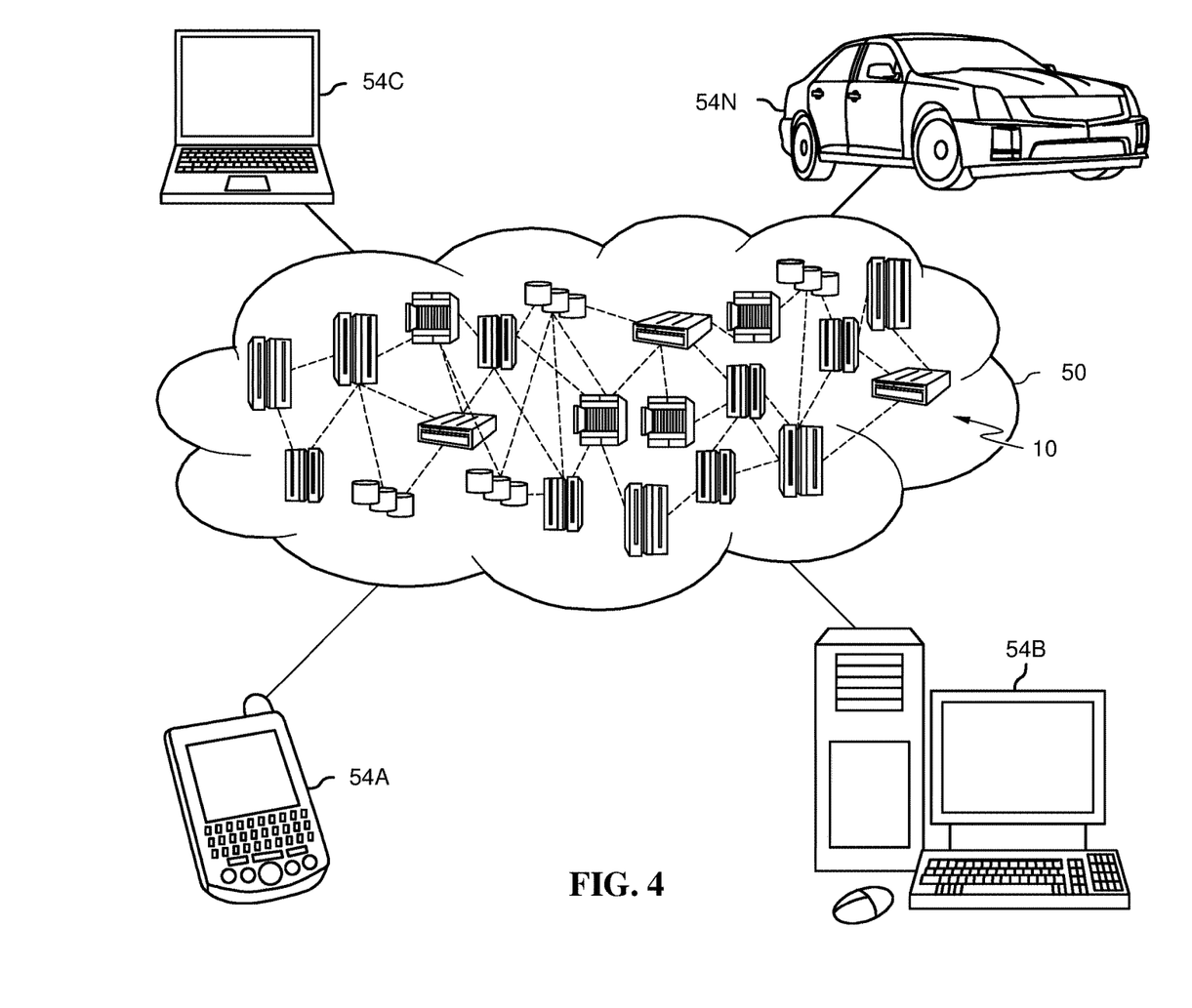
FIG. 4 depicts a cloud computing environment, in accordance with some embodiments of the present disclosure.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
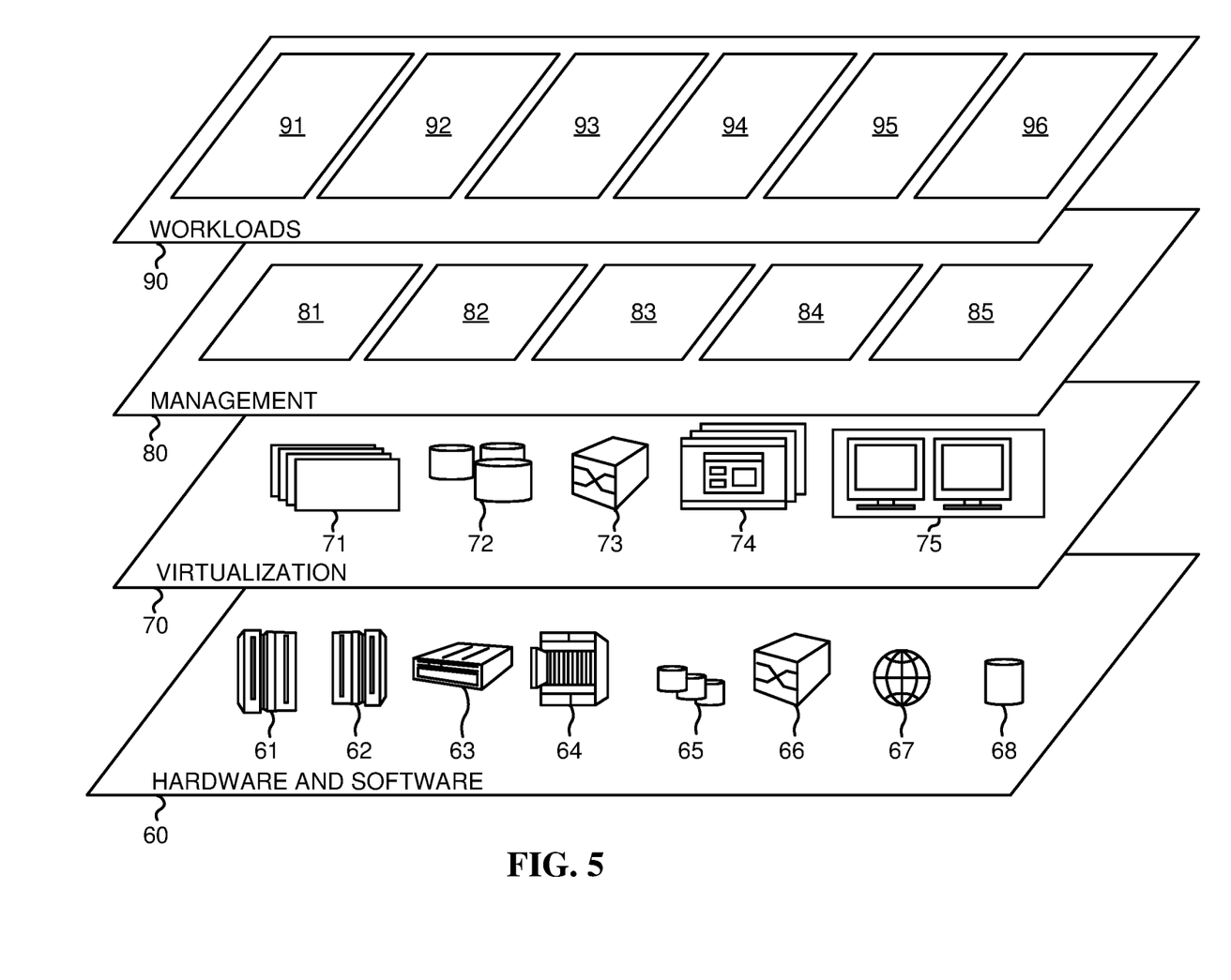
FIG. 5 depicts abstraction model layers, in accordance with some embodiments of the present disclosure.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and automatic identification of unauthorized robocallers using burst detection 96.

Embodiments of the present invention can be a system, a method, and/or a computer program product at any possible technical detail level of integration. The computer program product can include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions can be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions can also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams can represent a module, segment, or subset of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While it is understood that the process software (e.g., any of the instructions stored in instructions 360 of FIG. 3 and/or any software configured to perform any portion of the method described with respect to FIG. 2 and/or implement the functionality discussed in FIG. 1 can be deployed by manually loading it directly in the client, server, and proxy computers via loading a storage medium such as a CD, DVD, etc., the process software can also be automatically or semi-automatically deployed into a computer system by sending the process software to a central server or a group of central servers. The process software is then downloaded into the client computers that will execute the process software. Alternatively, the process software is sent directly to the client system via e-mail. The process software is then either detached to a directory or loaded into a directory by executing a set of program instructions that detaches the process software into a directory. Another alternative is to send the process software directly to a directory on the client computer hard drive. When there are proxy servers, the process will select the proxy server code, determine on which computers to place the proxy servers' code, transmit the proxy server code, and then install the proxy server code on the proxy computer. The process software will be transmitted to the proxy server, and then it will be stored on the proxy server.

Embodiments of the present invention can also be delivered as part of a service engagement with a client corporation, nonprofit organization, government entity, internal organizational structure, or the like. These embodiments can include configuring a computer system to perform, and deploying software, hardware, and web services that implement, some or all of the methods described herein. These embodiments can also include analyzing the client's operations, creating recommendations responsive to the analysis, building systems that implement subsets of the recommendations, integrating the systems into existing processes and infrastructure, metering use of the systems, allocating expenses to users of the systems, and billing, invoicing (e.g., generating an invoice), or otherwise receiving payment for use of the systems.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments can be practiced. These embodiments were described in sufficient detail to enable those skilled in the art to practice the embodiments, but other embodiments can be used and logical, mechanical, electrical, and other changes can be made without departing from the scope of the various embodiments. In the previous description, numerous specific details were set forth to provide a thorough understanding the various embodiments. But the various embodiments can be practiced without these specific details. In other instances, well-known circuits, structures, and techniques have not been shown in detail in order not to obscure embodiments.

Different instances of the word "embodiment" as used within this specification do not necessarily refer to the same embodiment, but they can. Any data and data structures illustrated or described herein are examples only, and in other embodiments, different amounts of data, types of data, fields, numbers and types of fields, field names, numbers and types of rows, records, entries, or organizations of data can be used. In addition, any data can be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

Any advantages discussed in the present disclosure are example advantages, and embodiments of the present disclosure can exist that realize all, some, or none of any of the discussed advantages while remaining within the spirit and scope of the present disclosure.

A non-limiting list of examples are provided hereinafter to demonstrate some aspects of the present disclosure. Example 1 is a computer-implemented method. The method includes maintaining a list of newly assigned phone numbers; intermittently removing phone numbers from the list of newly assigned phone numbers; determining that a newly assigned phone number initiates a number of calls per a unit time that exceeds a threshold number of calls per the unit time; and automatically flagging the newly assigned phone number as a possible robocaller.

Example 2 includes the method of example 1, including or excluding optional features. In this example, the phone numbers that are removed from the list of newly assigned phone numbers are removed after being activated for a period of time that satisfies an age threshold.

Example 3 includes the method of any one of examples 1 to 2, including or excluding optional features. In this example, the method further comprises: maintaining a list of authorized robocallers and their respective phone numbers; determining that the newly assigned phone number is not on the list of authorized robocallers; and wherein the newly assigned phone number is flagged as an unauthorized robocaller.

Example 4 includes the method of any one of examples 1 to 3, including or excluding optional features. In this example, the method further comprises: automatically suspending the newly assigned phone number.

Example 5 includes the method of any one of examples 1 to 4, including or excluding optional features. In this example, the newly assigned phone number comprises a telephone number established by a telephone company (telco).

Example 6 includes the method of any one of examples 1 to 5, including or excluding optional features. In this example, the newly assigned phone number comprises a Voice Over Internet Protocol (VOIP) phone number.

Example 7 includes the method of any one of examples 1 to 6, including or excluding optional features. In this example, the method is performed by one or more computers according to software that is downloaded to the one or more computers from a remote data processing system. Optionally, the method further comprises: metering a usage of the software; and generating an invoice based on metering the usage.

Example 8 is a system. The system includes one or more processors and one or more computer-readable storage media storing program instructions which, when executed by the one or more processors, are configured to cause the one or more processors to perform a method according to any one of examples 1 to 7.

Example 9 is a computer program product. The computer program product includes one or more computer readable storage media, and program instructions collectively stored on the one or more computer readable storage media, the program instructions comprising instructions configured to cause one or more processors to perform a method according to any one of examples 1 to 7.

What is claimed is:

1. A computer-implemented method comprising:
   maintaining a list of newly assigned phone numbers;
   intermittently removing phone numbers from the list of newly assigned phone numbers after satisfying a threshold amount of call activity;
   determining that a newly assigned phone number initiates a number of calls per a unit time that exceeds a threshold number of calls per the unit time;
   automatically flagging the newly assigned phone number as a possible robocaller; and
   automatically suspending the newly assigned phone number.

2. The method of claim 1, wherein the phone numbers that are removed from the list of newly assigned phone numbers are removed after being activated for a period of time that satisfies an age threshold.

3. The method of claim 1, wherein the method further comprises:
   maintaining a list of authorized robocallers and their respective phone numbers;
   determining that the newly assigned phone number is not on the list of authorized robocallers; and
   wherein the newly assigned phone number is flagged as an unauthorized robocaller.

4. The method of claim 1, wherein the newly assigned phone number comprises a telephone number established by a telephone company (telco).

5. The method of claim 1, wherein the newly assigned phone number comprises a Voice Over Internet Protocol (VOIP) phone number.

6. The method of claim 1, wherein the method is performed by one or more computers of a provider of the newly assigned phone numbers according to software that is downloaded to the one or more computers from a remote data processing system.

7. The method of claim 6, wherein the method further comprises:
   metering a usage of the software; and
   generating an invoice based on metering the usage.

8. A system comprising:
   one or more computer readable storage media storing program instructions; and
   one or more processors which, in response to executing the program instructions, are configured to perform a method comprising:
   maintaining a list of newly assigned phone numbers;
   intermittently removing phone numbers from the list of newly assigned phone numbers after satisfying a threshold amount of call activity;

determining that a newly assigned phone number initiates a number of calls per a unit time that exceeds a threshold number of calls per the unit time;
automatically flagging the newly assigned phone number as a possible robocaller; and
automatically suspending the newly assigned phone number.

9. The system of claim 8, wherein the phone numbers that are removed from the list of newly assigned phone numbers are removed after being activated for a period of time that satisfies an age threshold.

10. The system of claim 8, wherein the method further comprises:
maintaining a list of authorized robocallers and their respective phone numbers;
determining that the newly assigned phone number is not on the list of authorized robocallers; and
wherein the newly assigned phone number is flagged as an unauthorized robocaller.

11. The system of claim 8, wherein the newly assigned phone number comprises a telephone number established by a telephone company (telco).

12. The system of claim 8, wherein the newly assigned phone number comprises a Voice Over Internet Protocol (VOIP) phone number.

13. A computer program product comprising one or more computer readable storage media, and program instructions collectively stored on the one or more computer readable storage media, the program instructions comprising instructions configured to cause one or more processors to perform a method comprising:
maintaining a list of newly assigned phone numbers;
intermittently removing phone numbers from the list of newly assigned phone numbers after satisfying a threshold amount of call activity;
determining that a newly assigned phone number initiates a number of calls per a unit time that exceeds a threshold number of calls per the unit time; and
automatically flagging the newly assigned phone number as a possible robocaller; and
automatically suspending the newly assigned phone number.

14. The computer program product of claim 13, wherein the phone numbers that are removed from the list of newly assigned phone numbers are removed after being activated for a period of time that satisfies an age threshold.

15. The computer program product of claim 13, wherein the method further comprises:
maintaining a list of authorized robocallers and their respective phone numbers;
determining that the newly assigned phone number is not on the list of authorized robocallers; and
wherein the newly assigned phone number is flagged as an unauthorized robocaller.

16. The computer program product of claim 13, wherein the newly assigned phone number comprises a telephone number established by a telephone company (telco).

17. The computer program product of claim 13, wherein the newly assigned phone number comprises a Voice Over Internet Protocol (VOIP) phone number.

18. The method of claim 1, wherein automatically flagging the newly assigned phone number as the possible robocaller further comprises:
transmitting a first notification to a provider of the newly assigned phone number indicating that the newly assigned phone number is flagged as the possible robocaller; and
transmitting a second notification to the newly assigned phone number indicating the that newly assigned phone number is flagged as the possible robocaller.

19. The method of claim 1, wherein the method further comprises:
determining that the newly assigned phone number places calls to sequentially numbered phone numbers; and
wherein automatically flagging the newly assigned phone number as the possible robocaller is based on the number of calls per the unit time that exceeds the threshold number of calls per the unit time and the calls to the sequentially numbered phone numbers.

20. The method of claim 1, wherein the method further comprises:
determining that the newly assigned phone number places calls that have an average duration that satisfies a duration threshold; and
wherein automatically flagging the newly assigned phone number as the possible robocaller is based on the number of calls per the unit time that exceeds the threshold number of calls per the unit time and the calls that have the average duration that satisfies the duration threshold.

* * * * *